Jan. 18, 1966 C. M. DUNN 3,230,500

TRANSMISSION OF TELEPHONY SPECTRUM OVER VLF CHANNELS

Filed Aug. 26, 1963 6 Sheets-Sheet 1

INVENTOR.
CLETUS M. DUNN
BY Ernest F. Weinberger
Max L. Farmer
ATTORNEYS

Jan. 18, 1966 C. M. DUNN 3,230,500

TRANSMISSION OF TELEPHONY SPECTRUM OVER VLF CHANNELS

Filed Aug. 26, 1963 6 Sheets-Sheet 2

INVENTOR
CLETUS M. DUNN
BY Ernest J. Weinberger
Max L. Tanner
ATTORNEYS

TRANSMISSION OF TELEPHONY SPECTRUM OVER VLF CHANNELS

Filed Aug. 26, 1963 6 Sheets-Sheet 3

INVENTOR.
CLETUS M. DUNN
BY Ernest J. Weinberger
Max L. Palmer
ATTORNEYS

INVENTOR.
CLETUS M. DUNN
BY Ernest F. Weinberger
Max L. Farmer
ATTORNEYS

TRANSMISSION OF TELEPHONY SPECTRUM OVER VLF CHANNELS

Filed Aug. 26, 1963 6 Sheets-Sheet 5

INVENTOR.
CLETUS M. DUNN
BY Ernest J. Weinberger
Max L. Farmer
ATTORNEYS

INVENTOR.
CLETUS M. DUNN
BY Ernest J. Weinberger
Max [illegible]
ATTORNEYS 3,230,500

TRANSMISSION OF TELEPHONY SPECTRUM OVER VLF CHANNELS

Cletus M. Dunn, Waterford, Conn., assignor to the United States of America as represented by the Secretary of the Navy Filed Aug. 26, 1963, Ser. No. 304,711
3 Claims. (Cl. 340—5)
(Granted under Title 35, U.S. Code (1952), sec. 266)

The invention described herein may be manufactured and used by or for the Government of the United States of America for governmental purposes without the payment of any royalties thereon or therefor.

The present invention relates to VLF transmission and more particularly to the modulation of a VLF transmitter to permit the transmission of various relatively broadband signals, as, for example, human speech without impairment of intelligibility and accuracy to a distant underwater station.

The problem of low frequency, long range, secured, antijam, electromagnetic communication between two distant stations, one of which is submerged, has long existed. Clearly, if neither station is submerged, the problem does not exist except for securing and providing antijam forms of communication, but when one of the stations is a submarine, which as is the case, is tactically deployed and not proximate the surface to permit direct communication, another communication system is necessary. Further, it is desirable to conserve transmission bandwidth and yet allow the transmission of speech over great distances. The advantage of voice communication lies in the fact that a particular voice is easily recognized, thereby offering increased security and furthermore the human ear can discern the voice intelligence more readily in a noise background than other forms of communication. Human speech has been considered as a highly variable uncoded waveform. Speech, therefore, may be considered as both message and signal derived from information in the human brain and intended for information in another human brain. Being both message and signal, there is therefore a distinct advantage in using speech over other forms of uncoded and coded waveforms. If high enough accuracy of transmission is obtainable, the information in speech (e.g. inflection, pauses, modulation) not expressable merely in words per unit time may be used in a sophisticated manner and applied to security of information. It also follows that upon receipt of the speech transmitted material there may be made a correlation with the original in any manner desired including both tangible and intangible properties of the basic information.

Considering first the presently available communication systems they do not employ voice on the VLF channel, or similar signalling comparable in bandwidth, due to the bandwidth limitation of this channel. The VLF transmitting systems are bandwidth limited by the characteristics of the transmitting antenna system which, for example, have practical bandwidth of 16 to 60 c.p.s. in the carrier frequency range from 14 to 30 kc. Where, as with the military, it is desirable to use voice communication, the conditions with increased bandwidth of VLF under which reliable communication may be achieved are far too limited by natural propagation phenomena (interference) as well as jamming. The low frequency, narrow bandwidth channels have suitable characteristics, but are unable to accommodate the larger bandwidths except by particular uneconomical techniques.

In addition to the problem of frequency and spectrum, direct communication to a submerged submarine is extremely difficult due to the fact that the transmitted energy is attenuated exponentially by the water it must traverse, so that the energy at any appreciable depth is insufficient to provide reliable reception. A solution which in one system obviates these major drawbacks would provide a reliable and accurate form of communication between distant stations separated from one another by two distinct, different mediums through which the signal must travel.

It is an object of this invention to provide a reliable, accurate, relatively interference free method and system for VLF communication between two distant stations, one of which may be submerged under water.

A further object of this invention is to provide a secured, narrow band voice communication VLF channel suitable for long range communication.

Another object is to provide a relay link for the conversion of signal energy for communication between two stations each in a different medium.

Other objects and advantages will appear from the following description of an example of the invention, and the novel features will be particularly pointed out in the appended claims.

Figure 1:
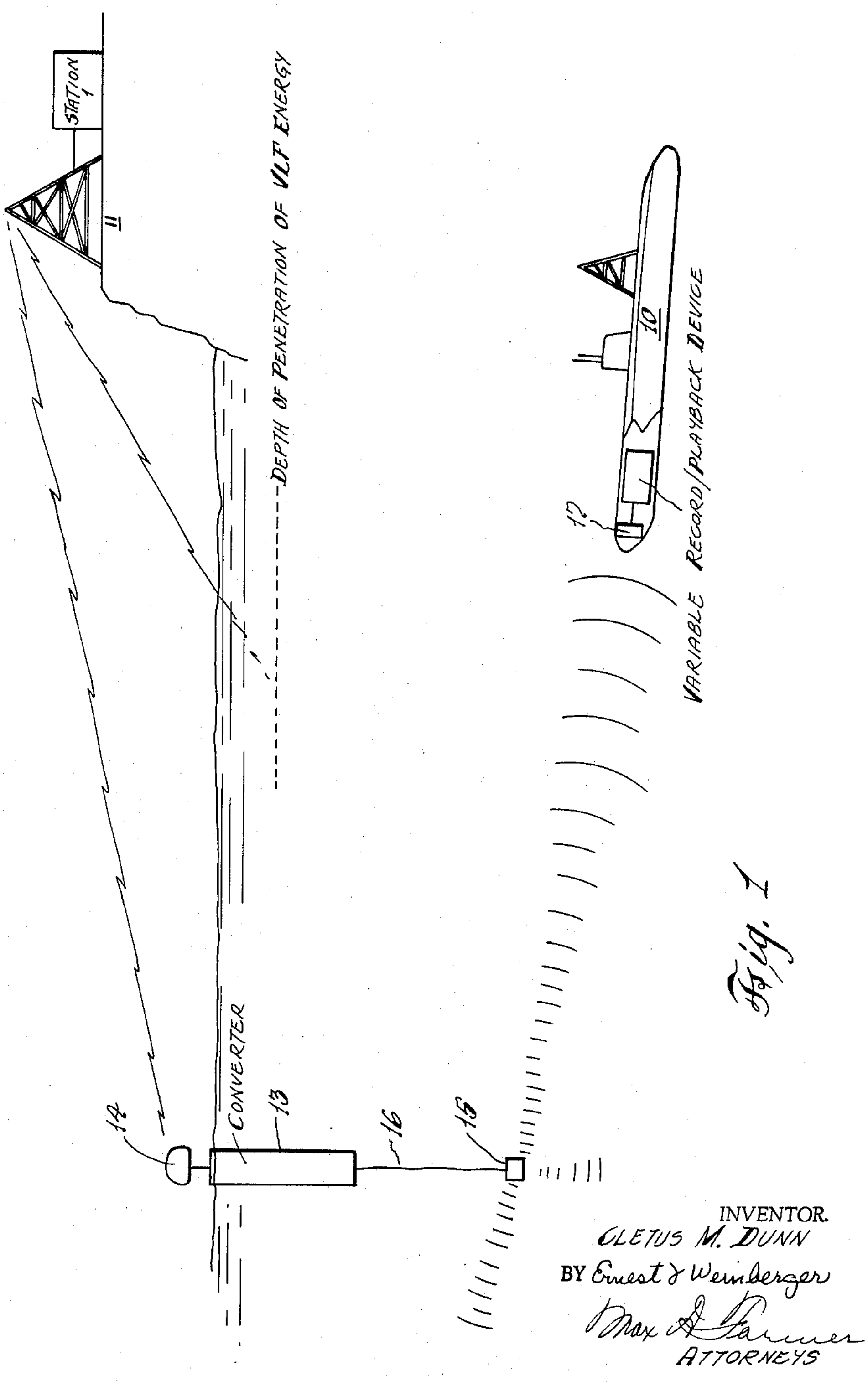
FIG. 1 is a pictorial representation of a communication system embodying the principle of this invention.

Considering first the problem of long range electromagnetic communication with a submerged vessel, such as a submarine on station, and which vessel is below the depth of penetration of VLF energy, the illustrated embodiment of FIG. 1 shows a submarine 10 with which communication from a shore station 11 is desired. The most direct form of such communication would be where the submarine is surfaced and receives the message by way of its antenna or where it is positioned just below the surface, providing the energy impinging thereon is of sufficient strength to be detected. In either case, the submarine is vulnerable and exposed. Therefore, the most desirable form of signalling would be one where the vessel remains deeply submerged while on station. This problem is uniquely solved by disposing a converter between the submarine and the shore transmitter. As illustrated, the converter is housed within a floating member or buoy 13 which carries an antenna 14 above the water line and supports an acoustic underwater transducer 15 by way of cable 16. A VLF modulated carrier wave is transmitted by the shore station 11 or if convenient by a ship. The energy is received by converter antenna 14 and then converted into audio frequency energy by, as for example, heterodyning the VLF down. The audio energy is amplified and transmitted by transducer 15 which is disposed a sufficient distance below the water surface to readily permit underwater communication to the submarine. The acoustic energy is converted to electrical energy by a hydrophone or transducer 17 carried by the submarine and thereafter detected to provide the original signal employed to modulate the VLF transmitter. A reverse signal transmission can be easily accomplished by merely transmitting the acoustic energy from the submarine to the converter 13 wherein the converter transceiver generates a VLF modulated carrier wave at the antenna and is detected at the shore station.

Figure 2:
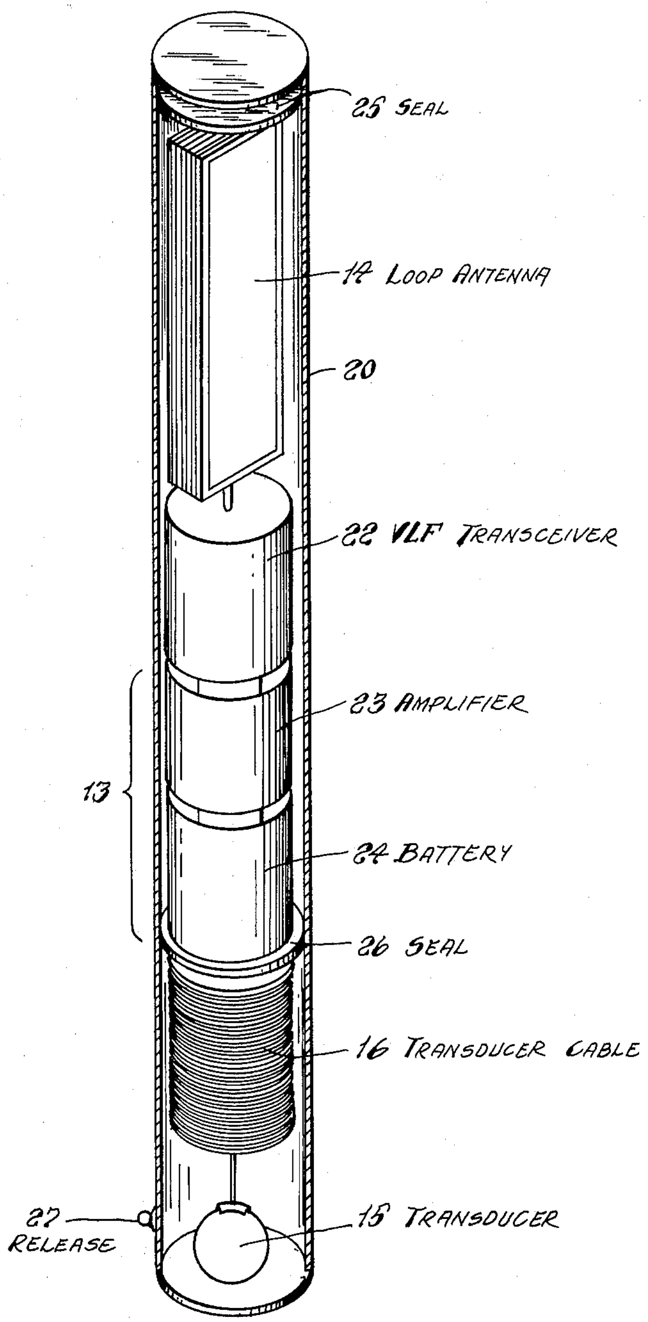
FIG. 2 is a cross-sectional view of a buoy-converter.
Figure 3:
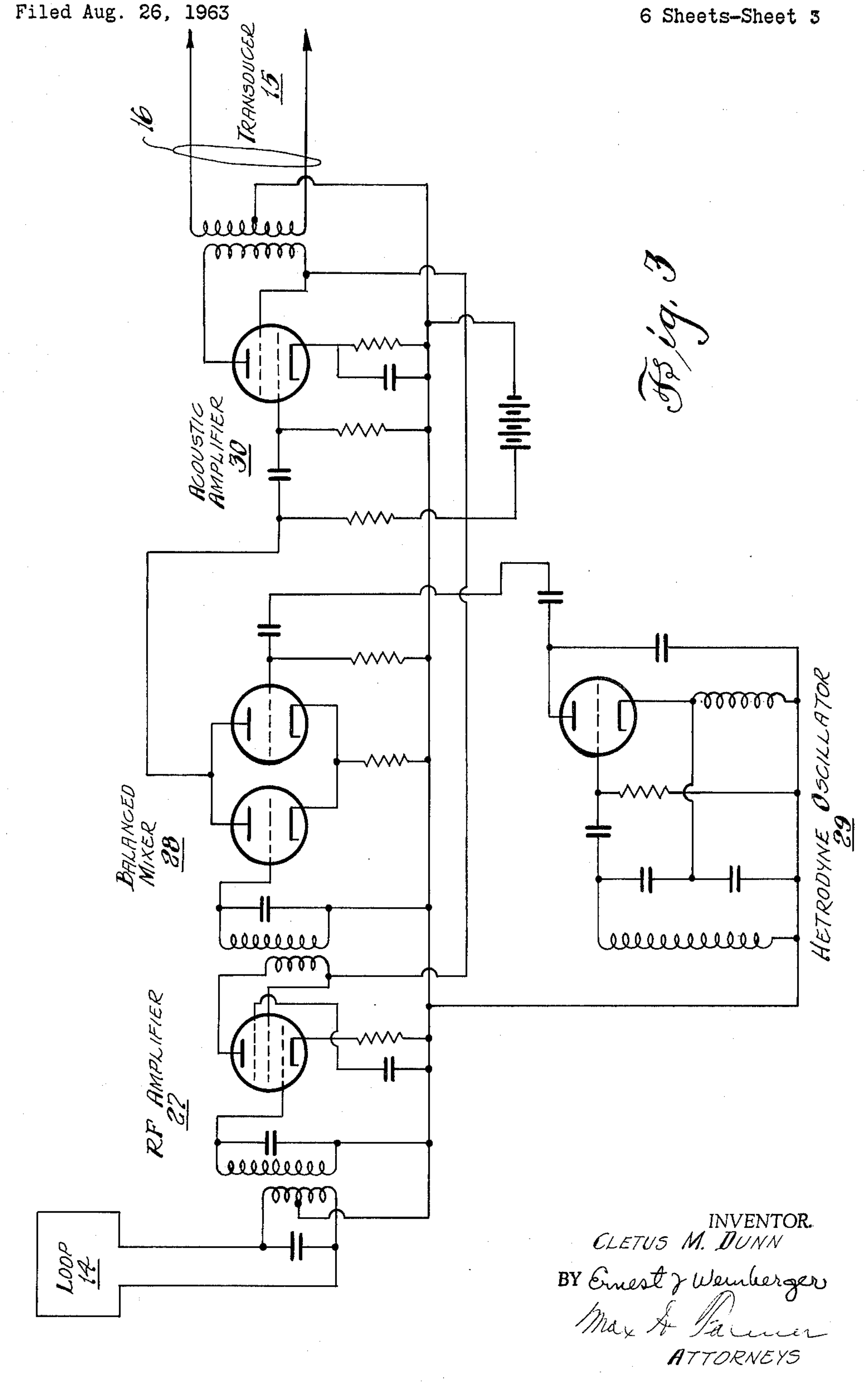
FIG. 3 is a schematic of the converter portion of FIG. 2.

In the illustrated embodiment of FIG. 2, a cylindrical buoyant chamber 20 having two sealed compartments, an upper compartment containing therein a loop antenna 14, a miniaturized VLF transceiver 22, an audio amplifier 23 and a source of electrical energy such as battery 24 and a lower compartment containing a reel of cable 16 and a transducer 15. The seals 25 and 26 maintain the fluid integrity of the upper chamber compartment. The size and configuration of the buoy are so proportioned that it will float vertically in water with the loop antenna above the water line while a release mechanism, generally designated at 27, is provided to open the lower compartment and release the cable 16 with its attached transducer 15. The release mechanism can be of the type such that upon release of the buoy the lower chamber compartment is opened or one in which the releasing is accomplished by a water switch such as a salt switch wherein the salt or other water soluble material when dissolved activates the release. The buoy may be ejected by the submarine through its torpedo tubes or one which is dropped from above by either an aircraft or surface ship. How the buoy is delivered is not of consequence, but it should, nevertheless, be capable of many forms of launching. The converter portion 13, although of standard circuitry, is illustrated schematically in FIG. 3 as one possible configuration. The loop antenna 14 is coupled into a conventional R.F. amplifier stage 27 wherein the incoming modulated carrier wave is amplified and thereafter coupled into one-half of a balanced mixer stage 28. The other mixer input is derived from a heterodyning oscillator 29. The heterodyne frequency is mixed with the amplified carrier and the difference frequency is applied to an audio or acoustic amplifier 30 from whence the amplified audio energy is fed via cable 16 to transducer 15 and radiated into the surrounding water. Although only the conversion from electromagnetic to acoustic energy is illustrated for simplicity, a standard transceiver may be employed to convert in either direction, that is, the acoustic energy from the submarine is applied as the modulation to the VLF transmitter and then transmitted via the converter antenna.

Figure 4:
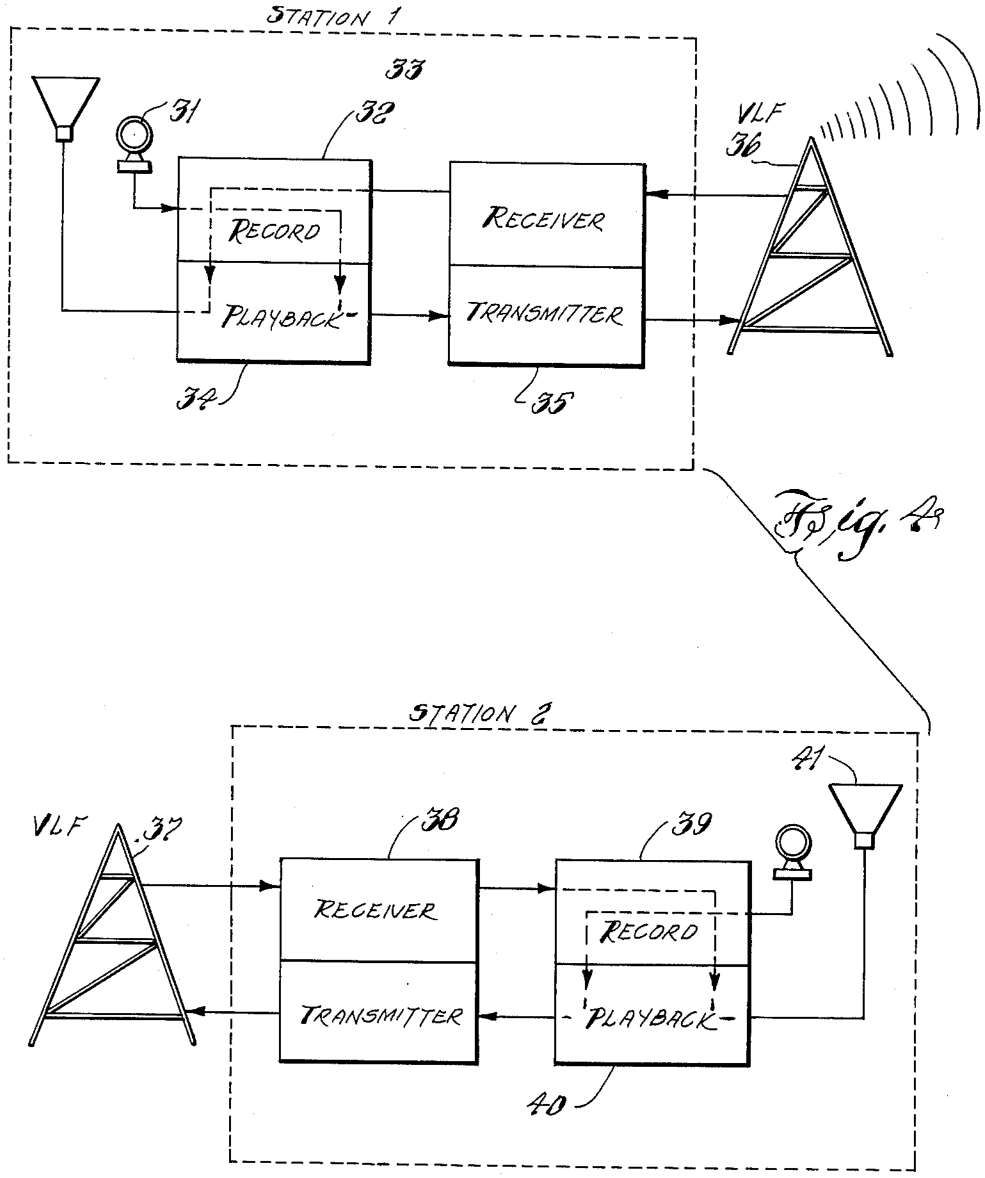
FIG. 4 is a block diagram of a two station VLF communication system.

The above-described system permits VLF communication with a submarine via an intermediate converter. Clearly where the VLF channel employed is in the low end of the spectrum, it is impossible to employ an infinitely variable waveform signal or intelligence such as human speech. A system of voice communication between VLF stations is illustrated in FIG. 4 wherein the two stations are identical. Considering first station 1 as the transmission originator a signal, such as speech, is applied via microphone 31 to record portion 32 of a reproducer 33. The recorder can be of any commercially available type such as a magnetic tape or wire deck or even a disc recorder. The voice signal is recorded at some convenient speed and either later or almost simultaneously played back at a reduced speed by the playback portion 34. By so reducing the playback speed, the bandwidth of the signal originally recorded is proportionally reduced although retaining all the original intelligence. In other words, as the time duration of the speech signal is increased, its bandwidth is decreased. This rather narrow bandwidth signal is employed to modulate the VLF carrier of transmitter 35 and then radiated by antenna 36. At station 2 the elecmagnetic signal is received by antenna 37, demodulated by receiver 38 and recorded by the record portion 39. The recorded information is played back at 40 at an increased speed so as to reproduce the original signal intelligence and thereafter applied to a loudspeaker 41. Obviously transmission from station 2 to station 1 can be accomplished in a similar manner.

To illustrate the invention, more particularly, a set of conditions have been selected which are consistent with the known requirements. However, the conditions under which the invention may be employed or practised are not limited to this set of conditions, but are broad and include series, sequences and combinations of coded and uncoded waveforms. It is assumed that a certain period of time is available in which it is practical to send a message although some messages may be sent in a longer or shorter time than illustrated herein. This time is Tp, namely, the amount of time available in which to send the original information. Tp is the transmitting time interval occupied by the speed of sending, and can be much longer, than the time required for the original message. Suppose that the original message happened to be 6 words that required 1½ seconds speaking time (the information content of the 6 words is purposely omitted here for clarity of the illustration so as to avoid possible confusion with technology called information bandwidth etc.). Using a conventional bandwidth for voice communication of 300 to 3600 cycles per second, a bandwidth of 3300 cycles per second is occupied for 1½ seconds by the original message of 6 words. Using conventional modulation (a) double sideband with carrier amplitude modulation, a bandwidth of 7200 cycles per second would be occupied for 1½ seconds; (b) single sideband suppressed carrier modulation, a bandwidth of 3300 cycles per second would be occupied for 1½ seconds, a known bandwidth reduction of about 2 to 1 exists for the single sideband mode, or alternatively, only the original message bandwidth is required. Increasing the time of transmission to 15 seconds, by resorting to non real time methods. (e.g., record-playback) increases transmitting time by a factor of 10, with a corresponding reduction in bandwidth by a factor of 10, or now 330 cycles per second. Another increase in transmission interval of time by a factor of 10 makes a ratio of 100, increasing the original transmission time interval from 1½ seconds to 150 seconds or 2½ minutes. A corresponding bandwidth reduction of 3300 divided by 100=33 cycles per second. That is, a 33 cycle per second bandwidth will be occupied 150 seconds (2½ minutes) by the original 6 spoken word message, so that the 6 spoken words are drawn out for 2½ minutes. In order to be recovered from the receiver, a receiver-recorder-playback system will be utilized to transfer from non real time, to real time, placing the signal in a 300 to 3600 cycle per second spectrum where the signal will operate as a message to produce information in this case in the human brain. The 33 cycle per second bandwidth, containing the voice spectrum, is applied to the VLF transmitter to single side band modulate it within the system capabilities. The VLF transmitting station radiates the bandwidth containing a reduced voice spectrum, called the signal power in what follows.

At the receiver available signal power competes with available noise power. Noise power may be caused by nature or by interference. A part of natural noise is generated by lightning, and is pulsive in nature, and has a duration varying from time to time. At an instant in time certain pulse duration, or pulse width of $\tau$ is assumed, and will pass through the receiver bandwidth and perhaps might appear in the 33 cycle bandwidth as well as on either side of this spectrum. Upon being transferred to real time, the 33 cycles per second spectrum as well as the entire output of the receiver will be affected by a factor of 100. The spectrum of 33 cycles per second will become a message of 300 to 3600 cycles per second. Pulses of duration $\tau$ will be reduced in width to $\tau/100$, with a new frequency spectrum 100 times greater than that received from nature. It is conceivable that part of the output noise power may occupy a frequency spectrum not occupied by the signal power, resulting in a so-called improvement in signal to noise ratio, a highly desirable condition.

As a means of reproducing the factor by which the interval of transmitting time is increased, a known tone is incorporated with the original speech spectrum at a frequency that produces least interference with speech but in the bandwidth. Upon recovery of the bandwidth at the output of the receiver-reproducer, the known tone is used with a discriminator-servo system to control the speed of the reproducer accurately so that the complete characteristics of the original message may be correlated in a precise manner with a copy of the original message as one of the steps in raising the reliability of communication to the value required.

Alternate application of this invention to signalling may include teletype, series, sequences or combinations of tones. For illustration, a group of tones essentially sine waves may be grouped for signalling control and message purposes in an original spectrum that (a) is more convenient technically than some other spectrum, (b) exists in some system and cannot be reproduced in another spectrum (c) has a privacy value in a chosen spectrum. This spectrum is reduced in bandwidth and transmitted with the advantage of the VLF spectrum. It is received and increased in spectrum for ease in separation by filtering, signal to noise ratio gain and for control purposes, as well as for the purpose of increasing accuracy and reliability of the control, communication, or position of the original information. These same advantages may be gained in any channel where narrow banding is the preferred technology, not because of system bandwidth restriction but because the signal to noise ratio gain is the predominant advantage desired.

Figure 5:
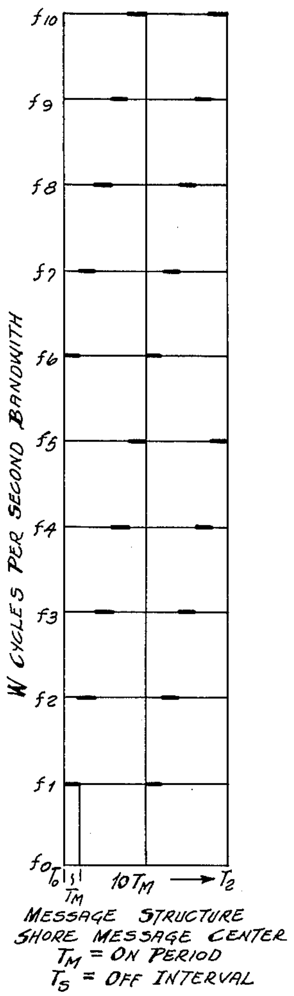
FIGS. 5 through 11 are graphical representations of a signal at various stages in the transmission and reception thereof.

Considering for the moment, a frequency tone signalling message as illustrated in FIG. 5 wherein at any instant at least two different frequency tones are coexistent in message form, their duration is $T_M$ with a total message time of 10 $T_M$ covering frequencies $f_0$, $f_1 \ldots f_{10}$ which total a bandwith of W cycles $$(f_{10}-f_0=W)$$

Figure 9:
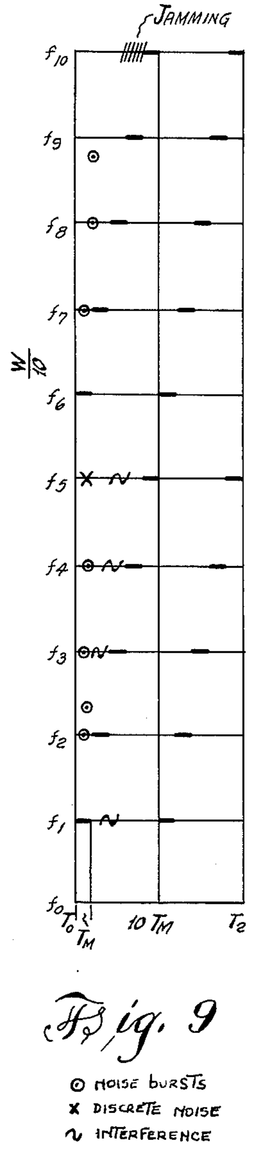
Figure 10:
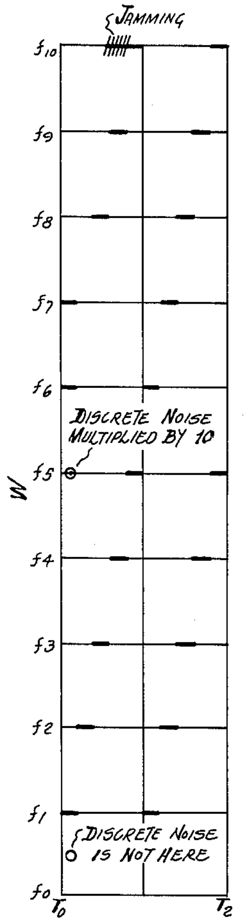
Figure 6:
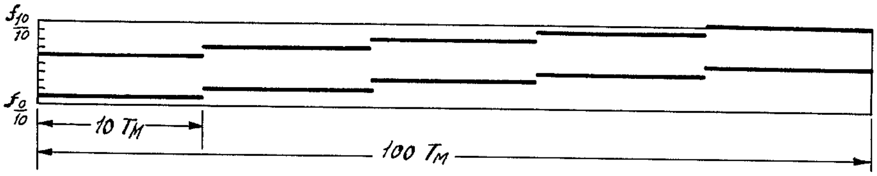
Figure 7:
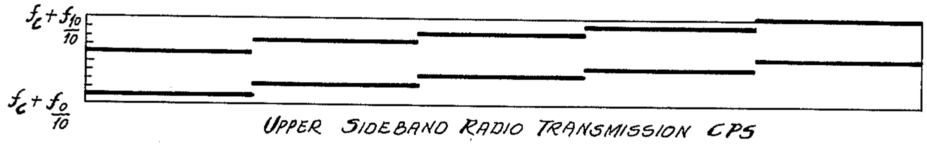
Figure 8:
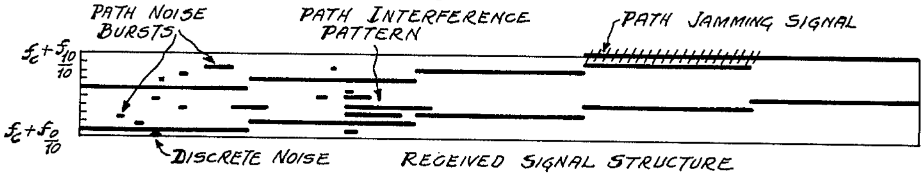

Although the frequencies are shown as discrete they are in reality a closed total bandwidth of W cycles/sec. This signal message is now recorded at some convenient speed N inches/sec. or r.p.m. and played back at a speed of $N/10$ so that the message bandwidth is reduced by a factor of 10 while its total time is increased by the same factor as clearly illustrated in FIG. 6. Each individual tone is frequency reduced by a factor of 10 to result in a total bandwidth of $W/10$ while its time duration is increased $T_M$. This playback non-real time message is employed to modulate a VLF carrier of $f_c$ c.p.s. and the upper sideband transmission as radiated is shown in FIG. 7. The signal as received, at the receiving station or if desired the converter of FIG. 1, is shown in FIG. 8 where, in addition to the transmitted information, noise bursts, interference and jamming have been added. FIG. 9 illustrates the demodulated output of the receiver after it has been recorded at some rate and played back at 10 times this rate to reconstruct the original message. It should be noted that although the noise and interference are still present, they represent only an extremely small portion of the time and are randomly distributed so that the message is still clearly discernable. By comb filtering (allowing only the discrete frequencies $f_1, f_2 \ldots f_{10}$) all the extraneous received information can be eliminated as shown in FIG. 10 except the jamming and the discrete noise which appear at the discrete frequencies. The same analysis applies to human speech except that the comb filtering would not be used but the interfering information would be greatly reduced in time duration, thereby permitting ease of understanding.

Figure 11:
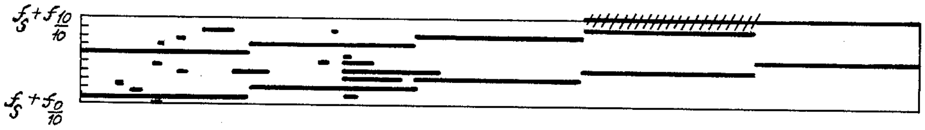

Referring back to FIG. 1 with the transmission at 11 corresponding to that just described and the conversion from VLF to acoustic energy at the converter 13, the transmitted acoustic signal is shown in FIG. 11 where the VLF has been heterodyned down to $f_s$ for proper transmission through water and received by way of hydrophone 17 and processed as before by the record/playback device (FIG. 1) to provide the same signal as shown in FIG. 10. To illustrate: Suppose a 30 cycle per second bandwidth centered at 15 kilocycles per second VLF contains the specified signals. The converter in effect subtracts 13 kilocycles per second heterodyne so that the transducer receives a 30 c.p.s. spectrum centered on 2 kcs. which it transmits at considerable power. The submarine sonar receiving set receives the 30 c.p.s. spectrum centered on 2 kc. p.s.

The advantage desired to be achieved by this invention is to be found in the methods and means of generating waveforms, converting them to signals that serve the double purpose of message and energy control, confining the bandwidth to gain power handling and efficiency advantages, increasing the transmission time intervals not only to improve accuracy of transmission in the first instance, but in the second instance as well, namely, to reduce intersymbol interference at long ranges received in the water. All these methods and means are combined herein in such a manner as to fully utilize the characteristics of the VLF radio channel of very long ranges (500–5000 miles) and an underwater acoustic channel of moderately long ranges (10 to 100 miles), thus reducing the period of time during which the signal may be interferred with. The narrow bandwidth of frequencies aids in signal versus noise advantages.

It will be understood that various changes in the details, materials and arrangements of parts (and steps), which have been herein described and illustrated in order to explain the nature of the invention, may be made by those skilled in the art within the principle and scope of the invention as expressed in the appended claims.

I claim:

1. A system for the transmission of an infinitely variable waveform signal from a first station to a second distant underwater station over a VLF channel which comprises:

(a) means for generating said waveform signal, (b) first reproducer means for extending the time duration of said waveform signal thereby decreasing its bandwidth, (c) a VLF transmitter having a modulator means for applying said extended waveform signal to said modulator and transmitting the same as a modulated carrier wave, (d) a converter link comprising:

(1) an antenna for receiving a VLF channel, (2) a VLF receiver for converting said modulated wave into an audio signal, (3) a transducer immersed in the water, (4) means for applying said audio signal to said transducer, said transducer converting and transmitting said audio signal into an underwater acoustic signal, (e) said underwater station carrying:

(1) a hydrophone for detecting said acoustic signal, (2) a demodulator for converting said acoustic signal into an audio signal, (3) a second reproducer means for decreasing the time duration of said audio signal to provide in said original waveform signal.

2. The system according to claim 1, wherein said first reproducer means is a recorder and said audio signal is recorded at one speed and reproduced at a slower speed and wherein said second reproducer means is a recorder and said audio signal is recorded at one speed and reproduced at a faster speed.

3. The system according to claim 2, further including a buoy and wherein said converter link is carried by said buoy.

(References on following page)

References Cited by the Examiner

UNITED STATES PATENTS

| | | | |
|---|---|---|---|
| 2,164,858 | 7/1939 | West | 340—12 |
| 2,534,060 | 12/1950 | Roberts | 325—311 X |
| 2,758,203 | 8/1956 | Harris | 325—116 |
| 2,798,902 | 7/1957 | Kursman et al. | 340—5 |
| 3,192,476 | 6/1965 | Nuffer et al. | 325—6 X |

OTHER REFERENCES

Isaak, R. D.: "Underwater Communication," Journal of the Acoustical Society of America, vol. 28, No. 4, July 1956 (pp. 556 and 557 relied on).

CHESTER L. JUSTUS, *Primary Examiner.*

MAYNARD R. WILBUR, *Examiner.*

R. A. FARLEY, *Assistant Examiner.*